US012749217B2

(12) United States Patent
Tsubota

(10) Patent No.: US 12,749,217 B2
(45) Date of Patent: Sep. 29, 2026

(54) POSITION INFORMATION ACQUISITION SYSTEM, POSITION INFORMATION ACQUISITION METHOD, AND PROGRAM

(71) Applicant: TOYOTA JIDOSHA KABUSHIKI KAISHA, Toyota (JP)

(72) Inventor: Tomohiro Tsubota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/734,260

(22) Filed: Jun. 5, 2024

(65) Prior Publication Data

US 2025/0029271 A1 Jan. 23, 2025

(30) Foreign Application Priority Data

Jul. 18, 2023 (JP) ................................ 2023-116830

(51) Int. Cl.

| | |
|---|---|
| ***G06T 7/70*** | (2017.01) |
| ***G06T 7/215*** | (2017.01) |
| ***G06T 7/246*** | (2017.01) |
| ***G06V 40/20*** | (2022.01) |

(52) U.S. Cl.

CPC ................ *G06T 7/70* (2017.01); *G06T 7/215* (2017.01); *G06T 7/251* (2017.01); *G06V 40/20* (2022.01); *G06T 2207/30196* (2013.01)

(58) Field of Classification Search

CPC ........... G06T 7/70; G06T 7/215; G06T 7/251; G06V 40/20

USPC ........................................................ 342/450

See application file for complete search history.

(56) References Cited

U.S. PATENT DOCUMENTS

| | | | |
|---|---|---|---|
| 2021/0097884 | A1 | 4/2021 | Tsutsumi et al. |
| 2021/0166180 | A1 | 6/2021 | Matsunaga |
| 2023/0046691 | A1 | 2/2023 | Christie et al. |

FOREIGN PATENT DOCUMENTS

| | | | | |
|---|---|---|---|---|
| EP | 4156675 | A1 * | 3/2023 | ............... G06T 1/20 |
| EP | 4495539 | A1 * | 1/2025 | ........... G01S 19/485 |
| JP | 2012-001995 | A | 1/2012 | |
| JP | 2021-051620 | A | 4/2021 | |
| JP | 2022083025 | A * | 6/2022 | |
| WO | 2018/087844 | A1 | 5/2018 | |

* cited by examiner

*Primary Examiner* — Harry K Liu

(74) *Attorney, Agent, or Firm* — Oliff PLC

(57) ABSTRACT

Provided is a position information acquisition system including: a position information acquisition unit configured to acquire position information from a plurality of sensors or devices operating on an object; and a switching unit configured to switch the sensor or the device for acquiring the position information according to a divided area, the divided area being a divided peripheral area of the object.

5 Claims, 16 Drawing Sheets

Fig. 4

| | | |
|---|---|---|
| WORK ELEMENT (EXAMPLE) | WORK VERB | TIGHTEN |
| | WORK OBJECT (PART) | PART X |
| | TOOL | POWER TOOL A |
| | WORK POSITION CODE | *** |
| | STANDARD TIME | 12 |

| | | | | | | | | | | | | | |
|---|---|---|---|---|---|---|---|---|---|---|---|---|---|
| UNIT WORK (EXAMPLE) | UNIT VERB | LAYER LEVEL | 1 | 2 | 2 | 2 | ⋯ | 1 | 2 | 2 | 2 | 2 |
| | | STEP | 1 | 1.1 | 1.2 | 1.3 | ⋯ | 4 | 4.1 | 4.2 | 4.3 | 4.4 |
| | | UNIT VERB | EXTRACT | CONVEY WITH EMPTY HANDS | GRASP | CONVEY | ⋯ | TIGHTEN | POSITION | OPERATE | OPERATE | OPERATE |
| | | SUPPLEMENTARY UNIT VERB | TIGHTENING PART | | | | ⋯ | | | SW ON | TIGHTENING | SW OFF |
| | | STANDARD TIME | 2 | 0.5 | 1 | 0.5 | ⋯ | 3 | 1 | - | 2 | - |
| | | STANDARD NUMBER OF TIMES | 1 | | | | ⋯ | 3 | | | | |
| | TOOL | | | | | | ⋯ | POWER TOOL A | | | | |
| | RECOGNITION | CATEGORY | | MOTION | MOTION | MOTION | ⋯ | | MOTION | EVENT | MOTION | EVENT |
| | | ITEM | | | | | ⋯ | | | START | | COMPLETED |

Fig. 5

| UNIT WORK (EXAMPLE) | UNIT VERB | | LAYER LEVEL | 1 | 2 | 2 | 2 | … | 1 | 2 | 2 | 2 | 2 |
|---|---|---|---|---|---|---|---|---|---|---|---|---|---|
| | | | STEP | 1 | 1.1 | 1.2 | 1.3 | … | 4 | 4.1 | 4.2 | 4.3 | 4.4 |
| | RECOGNITION | | CATEGORY | | MOTION | MOTION | MOTION | … | | MOTION | EVENT | MOTION | EVENT |
| | | | ITEM | | | | | … | | | START | | COMPLETED |
| WORK COMPONENT RECOGNITION MODEL CORRELATION DEFINITION (EXAMPLE) | WORK OBJECT | OBJECT RECOGNITION MODEL | NECESSITY | - | - | C | - | … | - | C | C | C | C |
| | | | RECOGNITION PATTERN | | | PARTS RECOGNITION | | … | | TOOL RECOGNITION | TOOL RECOGNITION | TOOL RECOGNITION | TOOL RECOGNITION |
| | | | RECOGNITION VARIATION | | | BOLT | | … | | POWER TOOL A | POWER TOOL A | POWER TOOL A | POWER TOOL A |
| | | | RELIABILITY | | | **% | | … | | **% | **% | **% | **% |
| | | PHYSICAL F/B RECOGNITION MODEL | NECESSITY | - | - | B | B | … | - | B | B | B | B |
| | | | RECOGNITION PATTERN | | | REACTION FORCE /VIBRATION | REACTION FORCE | … | | REACTION FORCE /VIBRATION | REACTION FORCE /VIBRATION | REACTION FORCE /VIBRATION | REACTION FORCE /VIBRATION |
| | | | RECOGNITION VARIATION | | | GRASP SMALL ITEM | MAINTAIN GRASPING SMALL ITEM | … | | POSITION TOOL | START TIGHTENING | TIGHTENING | TIGHTENING |
| | | | RELIABILITY | | | **% | **% | … | | **% | **% | **% | **% |
| | | STATE RECOGNITION/ MEASUREMENT MODEL | NECESSITY | - | - | - | - | … | - | C | - | - | C |
| | | | RECOGNITION PATTERN | | | | | … | | TIP POSITION | | | TIGHTENING OBJECT STATE |
| | | | RECOGNITION VARIATION | | | | | … | | POSITION TOOL | | | TIGHTENING COMPLETED |
| | | | RELIABILITY | | | | | … | | **% | | | **% |
| | WORKER | ACTION RECOGNITION MODEL | NECESSITY | - | A | A | A | … | - | - | A | A | A |
| | | | RECOGNITION PATTERN | | BODY ACTION | FINGER ACTION AND STATE | BODY AND FINGER ACTION | … | | | FINGER ACTION | FINGER ACTION | FINGER ACTION |
| | | | RECOGNITION VARIATION | | CONVEY WITH EMPTY HANDS | GRASP SMALL ITEM | CONVEY SMALL ITEM | … | | | TOOL SW ON | TOOL SW ON | TOOL SW OFF |
| | | | RELIABILITY | | **% | **% | **% | … | | | **% | **% | **% |
| | | GESTURE AND AUDIO RECOGNITION MODEL | NECESSITY | - | - | - | - | … | - | - | - | - | - |
| | | | RECOGNITION PATTERN | | | | | … | | | | | |
| | | | RECOGNITION VARIATION | | | | | … | | | | | |
| | | | RELIABILITY | | | | | … | | | | | |
| | EQUIPMENT AND TOOL | EQUIPMENT AND TOOL DATA RECOGNITION MODEL | NECESSITY | - | - | A | - | … | - | - | - | - | A |
| | | | RECOGNITION PATTERN | | | PART REMOVAL FOOL PROOF | | … | | | | | TIGHTENING COMPLETED TIGHTENING DATA |
| | | | RECOGNITION VARIATION | | | COMPLETION SIGNAL | | … | | | | | RECEIVE COMPLETION SIGNAL DATA |
| | | | RELIABILITY | | | **% | | … | | | | | **% |

Fig. 8
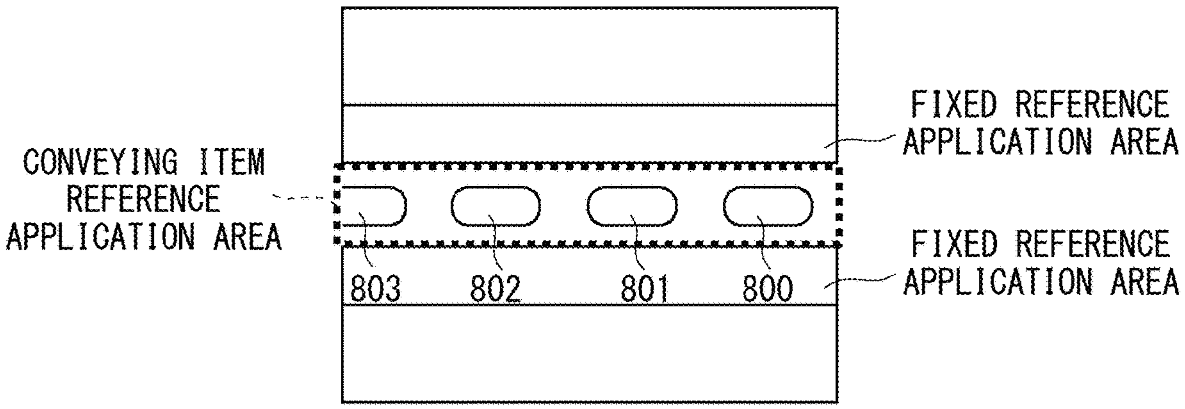
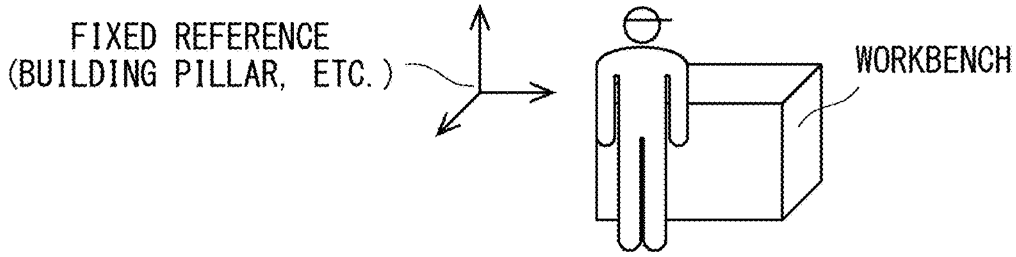
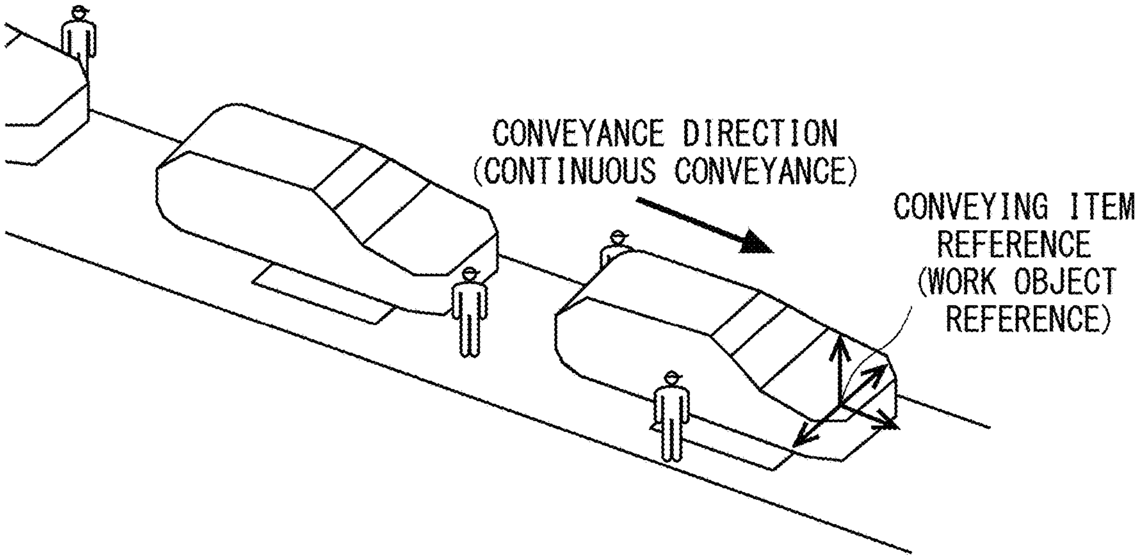

Fig. 10

| | | |
|---|---|---|
| WORK ELEMENT (EXAMPLE) | WORK VERB | TIGHTEN |
| | WORK OBJECT (PART) | PART X |
| | TOOL | POWER TOOL A |
| | WORK POSITION CODE | *** |
| | STANDARD TIME | 12 |

| | | | | | | | … | | | | | |
|---|---|---|---|---|---|---|---|---|---|---|---|---|
| UNIT WORK (EXAMPLE) | UNIT VERB | LAYER LEVEL | 1 | 2 | 2 | 2 | … | 1 | 2 | 2 | 2 | 2 |
| | | STEP | 1 | 1.1 | 1.2 | 1.3 | … | 4 | 4.1 | 4.2 | 4.3 | 4.4 |
| | | UNIT VERB | EXTRACT | CONVEY WITH EMPTY HANDS | GRASP | CONVEY | … | TIGHTEN | POSITION | OPERATE | OPERATE | OPERATE |
| | | SUPPLEMENTARY UNIT VERB | TIGHTENING PART | | | | … | | | SW ON | TIGHTENING | SW OFF |
| | | STANDARD TIME | 2 | 0.5 | 1 | 0.5 | … | 3 | 1 | – | 2 | – |
| | | STANDARD NUMBER OF TIMES | 1 | | | | … | 3 | | | | |
| | TOOL | | | | | | … | POWER TOOL A | | | | |
| | RECOGNITION | CATEGORY | | MOTION | MOTION | MOTION | … | | MOTION | EVENT | MOTION | EVENT |
| | | ITEM | | | | | … | | | START | | COMPLETED |
| | WORK POSITION DETAILS | REFERENCE COORDINATE | | FIXED | FIXED | FIXED | … | | CONVEY | CONVEY | CONVEY | CONVEY |
| | | TARGET PART | | DOMINANT HAND | DOMINANT HAND | DOMINANT HAND | … | | DOMINANT HAND | DOMINANT HAND | DOMINANT HAND | DOMINANT HAND |
| | | POSITION TYPE | | SPACE | SPACE | SPACE | … | | SPACE | SPACE | SPACE | SPACE |
| | | RANGE SPECIFICATION METHOD | | ROUTE | DIAGONAL | ROUTE | … | | DIAGONAL | DIAGONAL | DIAGONAL | DIAGONAL |

Fig. 11

| UNIT WORK (EXAMPLE) | UNIT VERB | | LAYER LEVEL | 1 | 2 | 2 | 2 | ... | 1 | 2 | 2 | 2 | 2 |
|---|---|---|---|---|---|---|---|---|---|---|---|---|---|
| | | | STEP | 1 | 1.1 | 1.2 | 1.3 | ... | 4 | 4.1 | 4.2 | 4.3 | 4.4 |
| | RECOGNITION | | CATEGORY | | MOTION | MOTION | MOTION | ... | | MOTION | EVENT | MOTION | EVENT |
| | | | ITEM | | | | | ... | | | START | | COMPLETED |
| WORK COMPONENT RECOGNITION MODEL CORRELATION DEFINITION (EXAMPLE) | WORK OBJECT | OBJECT RECOGNITION MODEL | NECESSITY | – | – | C | – | ... | – | C | C | C | C |
| | | | RECOGNITION PATTERN | | | PARTS RECOGNITION | | ... | | TOOL RECOGNITION | TOOL RECOGNITION | TOOL RECOGNITION | TOOL RECOGNITION |
| | | | RECOGNITION VARIATION | | | BOLT | | ... | | POWER TOOL A | POWER TOOL A | POWER TOOL A | POWER TOOL A |
| | | | RELIABILITY | | | **% | | ... | | **% | **% | **% | **% |
| | | PHYSICAL F/B RECOGNITION MODEL | NECESSITY | – | – | B | B | ... | – | B | B | B | B |
| | | | RECOGNITION PATTERN | | | REACTION FORCE /VIBRATION | REACTION FORCE | ... | | REACTION FORCE /VIBRATION | REACTION FORCE /VIBRATION | REACTION FORCE /VIBRATION | REACTION FORCE /VIBRATION |
| | | | RECOGNITION VARIATION | | | GRASP SMALL ITEM | MAINTAIN GRASPING SMALL ITEM | ... | | POSITION TOOL | START TIGHTENING | TIGHTENING | TIGHTENING |
| | | | RELIABILITY | | | **% | **% | ... | | **% | **% | **% | **% |
| | | STATE RECOGNITION/ MEASUREMENT MODEL | NECESSITY | – | – | – | – | ... | – | C | – | – | C |
| | | | RECOGNITION PATTERN | | | | | ... | | TIP POSITION | | | TIGHTENING OBJECT STATE |
| | | | RECOGNITION VARIATION | | | | | ... | | POSITION TOOL | | | TIGHTENING COMPLETED |
| | | | RELIABILITY | | | | | ... | | **% | | | **% |
| | WORKER | ACTION RECOGNITION MODEL | NECESSITY | – | A | A | A | ... | – | – | A | A | A |
| | | | RECOGNITION PATTERN | | BODY ACTION | FINGER ACTION AND STATE | BODY AND FINGER ACTION | ... | | | FINGER ACTION | FINGER ACTION | FINGER ACTION |
| | | | RECOGNITION VARIATION | | CONVEY WITH EMPTY HANDS | GRASP SMALL ITEM | CONVEY SMALL ITEM | ... | | | TOOL SW ON | TOOL SW ON | TOOL SW OFF |
| | | | RELIABILITY | | **% | **% | **% | ... | | | **% | **% | **% |
| | | GESTURE AND AUDIO RECOGNITION MODEL | NECESSITY | – | – | – | – | ... | – | – | – | – | – |
| | | | RECOGNITION PATTERN | | | | | ... | | | | | |
| | | | RECOGNITION VARIATION | | | | | ... | | | | | |
| | | | RELIABILITY | | | | | ... | | | | | |
| | EQUIPMENT AND TOOL | EQUIPMENT AND TOOL DATA RECOGNITION MODEL | NECESSITY | – | – | A | – | ... | – | – | – | – | A |
| | | | RECOGNITION PATTERN | | | PART REMOVAL FOOL PROOF | | ... | | | | | TIGHTENING COMPLETED TIGHTENING DATA |
| | | | RECOGNITION VARIATION | | | COMPLETION SIGNAL | | ... | | | | | RECEIVE COMPLETION SIGNAL DATA |
| | | | RELIABILITY | | | **% | | ... | | | | | **% |
| | WORK POSITION | WORK POSITION ESTIMATION MODEL | NECESSITY | | A | A | A | ... | | A | A | A | A |
| | | | REFERENCE COORDINATE | | FIXED | FIXED | FIXED | ... | | CONVEY | CONVEY | CONVEY | CONVEY |
| | | | TARGET PART | | DOMINANT HAND | DOMINANT HAND | DOMINANT HAND | ... | | DOMINANT HAND | DOMINANT HAND | DOMINANT HAND | DOMINANT HAND |
| | | | POSITION TYPE | | SPACE | SPACE | SPACE | ... | | SPACE | SPACE | SPACE | SPACE |
| | | | RELIABILITY | | **% | **% | **% | ... | | **% | **% | **% | **% |

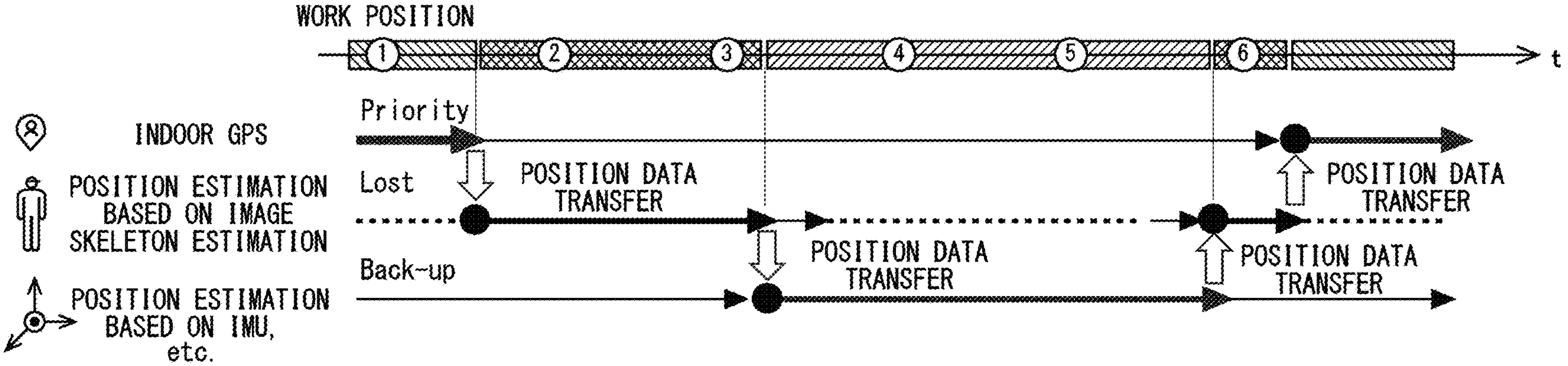
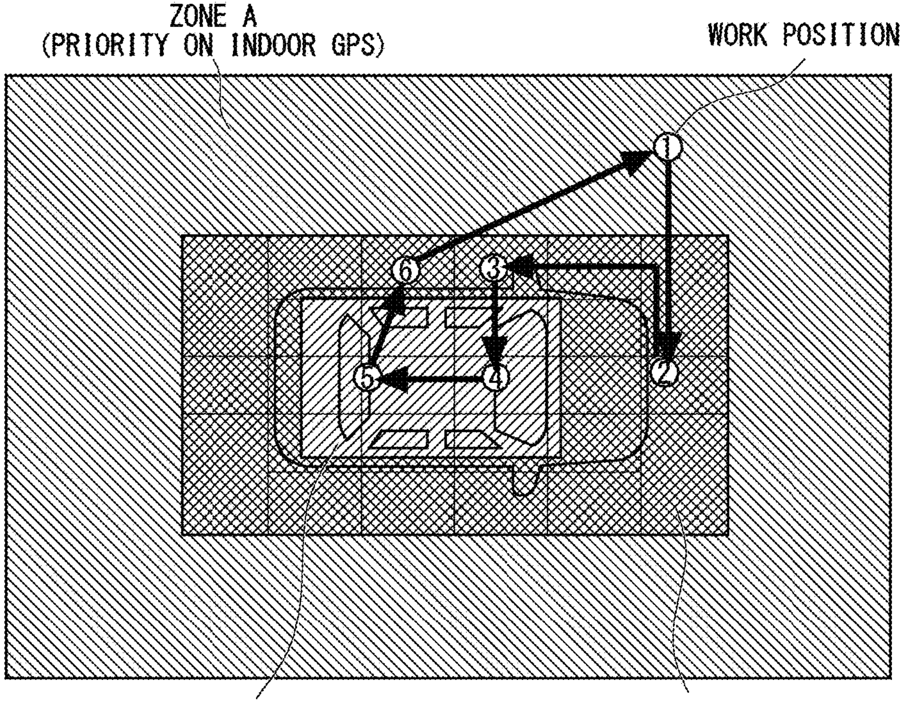
| ZONE | INDOOR GPS | POSITION ESTIMATION BASED ON IMAGE SKELETON ESTIMATION | POSITION ESTIMATION BASED ON IMU |
|---|---|---|---|
| A | PRIORITY 1 | – | PRIORITY 2 (Back-up) |
| B | PRIORITY 3 (Back-up) | PRIORITY 1 | PRIORITY 2 (Back-up) |
| C | – | PRIORITY 2 (Back-up) | PRIORITY 1 |
Fig. 15

POSITION INFORMATION ACQUISITION SYSTEM, POSITION INFORMATION ACQUISITION METHOD, AND PROGRAM

CROSS REFERENCE TO RELATED APPLICATIONS

This application is based upon and claims the benefit of priority from Japanese patent application No. 2023-116830, filed on Jul. 18, 2023, the disclosure of which is incorporated herein in its entirety by reference.

BACKGROUND

The present disclosure relates to a position information acquisition system, a position information acquisition method, and a program.

International Patent Publication No. WO 2018/087844 describes a work recognition method in which a sensor recognizes a worker's body information and an object and associates them with a work. The work recognition system of International Patent Publication No. WO 2018/087844 includes a sensor data acquisition unit for acquiring sensor data and a body part information acquisition unit for detecting a worker's body part and acquiring body part information about the worker's body part based on the sensor data. The work recognition system also includes an object information acquisition unit for detecting an object and acquiring object information about the object based on the sensor data, and an association unit for associating the object with the body part of the worker who has performed a work using the object based on the body part information and the object information. The work recognition system further includes a recognition result analysis unit for recognizing the work performed by the worker based on association information about a result of the association made by the association unit.

SUMMARY

When acquiring work performance data using a device such as a camera, GPS, IMU, or the like, the device may not be usable due to obstacles such as blind spots of the camera, or may not function accurately due to, for example, reflection and shielding of GPS radio waves, depending on the process and the positional relationship between such device and the product. Therefore, it may be difficult to ensure the robustness of data acquisition under various work environments and conditions in a work recognition system that recognizes a work based on a machine-learned model or a rule based on inputs from a plurality of devices. Therefore, an object of the present disclosure is to provide a position information acquisition system that can ensure the robustness and accuracy of data acquisition by providing a plurality of devices and automatically selecting the most appropriate device according to a work position.

A position information acquisition system according to the present disclosure includes:

- a position information acquisition unit configured to acquire position information from a plurality of sensors or devices operating on an object; and
- a switching unit configured to switch the sensor or the device for acquiring the position information according to a divided area, the divided area being a divided peripheral area of the object.

According to the above configuration, it is possible to provide a position information acquisition system that can ensure the robustness and accuracy of data acquisition by providing a plurality of devices and automatically selecting the most appropriate device according to a work position.

In the position information acquisition system according to the present disclosure, the divided area is an object separation area separated from the object, an object contact area in contact with the object, and an object interior area.

According to the above configuration, the peripheral area can be divided into the object separation region, the object contact region, and the object interior region.

In the position information acquisition system,

- in the object separation area, the position information is acquired by an indoor GPS (Global Positioning System) or an IMU (Inertial Measurement Unit),
- in the object contact area, the position information is acquired by image skeleton estimation, the IMU, or the indoor GPS, and
  - in the object interior area, the position information is acquired by the IMU or the image skeleton estimation.

According to the above configuration, by considering the accuracy and reliability of each means, indoor GPS, image skeleton estimation, and IMU, based on the divided areas, and by employing a priority and backup logic, it is possible to flexibly select the optimal means, ensuring robustness.

The position information acquisition system according to the present disclosure further includes:

- a reception unit configured to receive a production instruction; and
- an input control setting acquisition unit configured to acquire input control settings of a plurality of the sensors or devices in accordance with the production instruction.

With the above configuration, it is possible to receive the production instruction and set the input control of the plurality of sensors or devices in accordance with the production instruction.

A position information acquisition method according to the present disclosure includes:

- acquiring position information from a plurality of sensors or devices operating on an object; and
- switching the sensor or the device for acquiring the position information according to a divided area, the divided area being a divided peripheral area of the object.

According to the above configuration, it is possible to provide a position information acquisition method that can ensure the robustness and accuracy of data acquisition by providing a plurality of devices and automatically selecting the most appropriate device according to a work position.

A program according to the present disclosure causes an information processing apparatus to execute:

- acquiring position information from a plurality of sensors or devices operating on an object; and
- switching the sensor or the device for acquiring the position information according to a divided area, the divided area being a divided peripheral area of the object.

According to the above configuration, it is possible to provide a program that causes an information processing apparatus to acquire a position information and can ensure the robustness and accuracy of data acquisition by providing a plurality of devices and automatically selecting the most appropriate device according to a work position.

According to the present disclosure, it is possible to provide a position information acquisition system that can ensure the robustness and accuracy of data acquisition by providing a plurality of devices and automatically selecting the most appropriate device according to a work position.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 shows an example of the relationship between unit work and a recognition model according to the embodiment;

FIG. 5 is a continuation of the example of the relationship between unit work and the recognition model of FIG. 4 according to the embodiment;

FIG. 8 is a diagram explaining a reference coordinate setting unit for setting coordinates of a fixed reference and a conveying item (object) reference according to the embodiment;

FIG. 10 shows an example of adding a work position to a unit work according to the embodiment;

FIG. 11 is a continuation of an example of adding a work position to a unit work of FIG. 11 according to the embodiment;

FIG. 15 is a diagram (upper drawing) showing an example of cooperation of data acquisition of sensors corresponding to a work area according to the embodiment, an overview diagram of a work area (lower left drawing), and a table of correspondence between work areas and sensors (lower right drawing)

DESCRIPTION OF EMBODIMENTS

Embodiment

Embodiments of the present disclosure will now be described with reference to the drawings. However, the claimed disclosure is not limited to the following embodiments. Moreover, not all of the configurations described in the embodiments are essential as means for solving the problem. For the sake of clarity, the following descriptions and drawings have been omitted and simplified as appropriate. In each drawing, the same elements have the same reference signs, and repeated descriptions have been omitted as appropriate.

(Description of Work Recognition System According to Embodiment)

Figure 1:
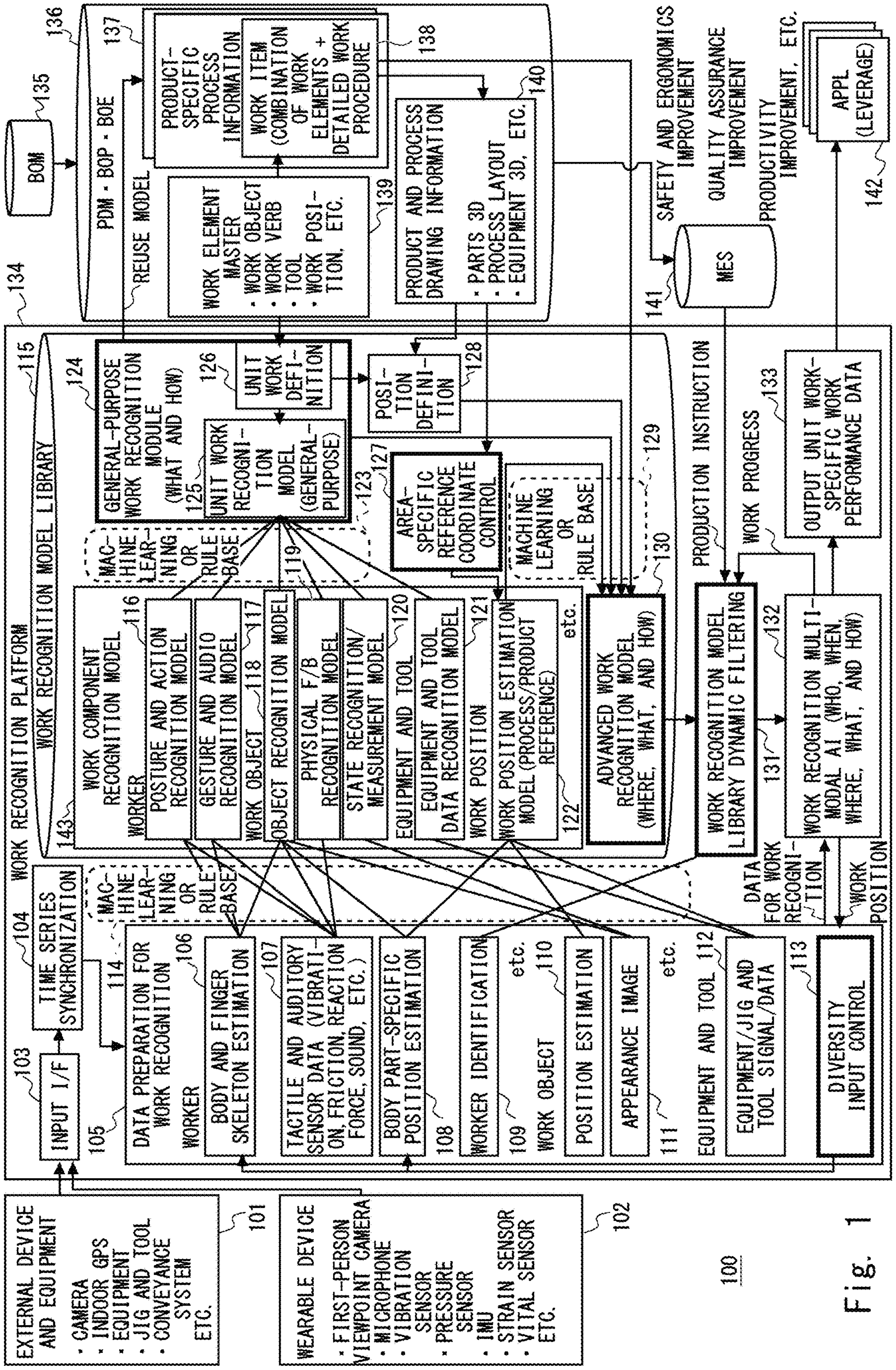
FIG. 1 is a block diagram showing a configuration of a work recognition system according to an embodiment.

FIG. 1 is a block diagram showing a configuration of a work recognition system according to the embodiment. The work recognition system according to the embodiment will be described with reference to FIG. 1.

As shown in FIG. 1, a work recognition system 100 includes external devices and equipment 101, a wearable device 102, and a work recognition platform 134. A peripheral system on the upstream side of the work recognition system 100 includes a BOM (Bill Of Materials, parts list) 135, a PDM (Product Data Management), a BOP (Bill Of Process), and a BOE (Bill Of Equipment) 136, and a MES (Manufacturing Execution System) 141. A peripheral system on the downstream side of the work recognition system 100 includes an APPL (Application, Application (Leverage)) 142.

The external devices and equipment 101 are external elements provided in the processes for purposes other than the system. The external devices and equipment 101 are, for example, cameras, indoor GPS (Global Positioning System), other equipment, jigs and tools, conveyance systems, and so on.

The wearable device 102 is a variety of sensors worn by a worker. The wearable device 102 is, for example, a first-person viewpoint camera, a microphone, a vibration sensor, a pressure sensor, an IMU (Inertial Measurement Unit), a strain sensor, a vital sensor, or the like.

The work recognition platform 134 is composed of an information processing apparatus (not shown) that is the center of the work recognition system according to the present disclosure. The information processing apparatus includes at least a processor (e.g., a CPU (Central Processing Unit)) that executes a program for executing a process and a memory that stores the program. The information processing apparatus may include a cloud server that distributes some or all of the functions. The work recognition platform 134 includes an input I/F (interface) 103, a time series synchronization unit 104, data preparation for work recognition 105, a learning/setting unit 114 based on the work recognition data preparation, a work recognition model library 115, a work recognition model library dynamic filtering unit 131, a work recognition multimodal AI 132, and a unit work-specific work performance data output unit 133.

The input I/F 103 is an interface for connecting with the external devices and equipment 101, and the wearable device 102.

The time series synchronization unit 104 temporally synchronizes data of each of the external devices and equipment 101 and the wearable device 102.

In the data preparation for work recognition 105, data for a model for recognizing work components related to workers, work objects, equipment and tools, and so on are prepared. The data preparation for work recognition 105 includes, for workers, a body and finger skeleton estimation unit 106, a tactile and auditory sensor data unit 107, a body part-specific position estimation unit 108, a worker identification unit 109, etc., for workers. The data preparation for work recognition 105 includes a position estimation unit 110 and an appearance image unit 111 for work objects. The data preparation for work recognition 105 includes an equipment/tool signal/data unit 112 for equipment and tools. The data preparation for work recognition includes a diversity input control unit 113.

The body and finger skeleton estimation unit 106 estimates the skeleton of the body and fingers using data from sensors or devices. The body and finger skeleton estimation unit 106 prioritizes and switches the sensors or devices used for skeleton estimation based on instructions from the diversity input control unit 113.

The tactile and auditory sensor data unit 107 acquires input data such as vibration, friction, reaction force, and sound from sensors or devices. The body part-specific position estimation unit 108 estimates the position of each body part using data from a sensor or a device. The body part-specific position estimation unit 108 prioritizes and switches sensors or devices used for position estimation of each body part by an instruction from the diversity input control unit 113. The worker identification unit 109 identifies a worker by ID (Identification) or the like.

The position estimation unit 110 estimates the position of a work object. The appearance image unit 111 acquires an appearance image by capturing an image of an appearance of the work object using the external devices and equipment 101 and the wearable device 102.

The equipment/jig and tool signal/data unit 112 acquires data of equipment and tools during work. The diversity input control unit 113 prioritizes and switches the sensors or devices to input data according to the work position.

The learning/setting unit 114 by work recognition data preparation is for constructing a work component recognition model 143 described later. The data prepared in the data preparation for work recognition 105 is learned or set to construct each part of the work component recognition model 143.

The work recognition model library 115 is a reference part of the work recognition platform 134. The work recognition model library 115 includes the work component recognition model 143, a learning/setting unit 123 based on the work component recognition model, a general-purpose work recognition module 124, an area-specific reference coordinate control unit 127, a position definition unit 128, the learning/setting unit 129 based on a work position, and an advanced work recognition model 130.

The work component recognition model 143 is a storage unit for storing each recognition model. The work component recognition model 143 includes a posture and action recognition model 116 and a gesture and audio recognition model 117 for a worker. The work component recognition model 143 includes an object recognition model 118, a physical F/B (feedback) recognition model 119, and a state recognition and measurement model 120 for a work object. The work component recognition model 143 includes an equipment and tool data recognition model 121 for equipment and tools. The work component recognition model 143 includes a work position estimation model 122 for a work position.

The posture and action recognition model 116 is a model for recognizing posture and action by learning or setting them from the body and finger skeleton estimation unit 106 and the tactile and auditory sensor data unit 107. The gesture and audio recognition model 117 is a model for recognizing gestures and audio by learning or setting them from the body and finger skeleton estimation unit 106 and the tactile and auditory sensor data unit 107.

The object recognition model 118 is a model for recognizing an object by learning or setting it from the body and finger skeleton estimation unit 106, the tactile and auditory sensor data unit 107, the body part-specific position estimation unit 108, and the appearance image unit 111. The physical F/B recognition model 119 is a model for recognizing physical feedback by learning or setting it from the tactile and auditory sensor data unit 107. The state recognition and measurement model 120 is a model for recognizing and measuring the state of a work object by learning or setting it from the appearance image unit 111.

The equipment and tool data recognition model 121 is a model for recognizing equipment and tool data by learning or setting them from the equipment/jig and tool signal/data unit 112. The work position estimation model 122 is a model for estimating the work position by acquiring information from the body part position estimation unit 108, the work object position estimation unit 110, and the equipment/jig and tool signal/data unit 112. The work position estimation model 122 is set in the process or product reference. The work position estimation model 122 acquires information from the area-specific reference coordinate control unit 127. Furthermore, the work position estimation model 122 provides data of the position estimation result to the learning/setting unit 129 based on the work position.

The learning/setting unit 123 based on the work component recognition model is a learning/setting unit for constructing a unit work recognition model 125 described later. The data prepared by the work component recognition model 143 is learned or set to construct the unit work recognition model 125.

The general-purpose work recognition module 124 is a unit work recognition unit for recognizing the unit work by inputting the information of movement, touch, hearing, position, camera, and equipment, and tools at the time of the work to the object of the worker into the unit work model. That is, the general-purpose work recognition module 124 recognizes what actions the worker has performed and how. The general-purpose work recognition module 124 includes the unit work recognition model 125 and a unit work definition unit 126.

The unit work recognition model 125 is a model for recognizing a work that can be defined generically among various works independent of products. The unit work recognition model 125 is generated in a unit work recognition model generation unit by combining components independent of products among work component recognition models based on work contents. For example, general-purpose work independent of products is a combination of verbs related to work objects such as tightening, fitting, and taking out common parts across products that do not contain product-specific information, and will be described later. The unit work recognition model 125 is a model that recognizes a unit work by learning or setting it from the posture and action recognition model 116, the gesture and audio recognition model 117, the object recognition model 118, the physical F/B recognition model 119, the state recognition and measurement model 120, and the equipment and tool data recognition model 121.

The unit work definition unit 126 defines a work for creating the unit work recognition model 125.

The area-specific reference coordinate control unit 127 controls changing the reference coordinate according to the area of the process. The area-specific reference coordinate control unit 127 provides fixed reference and product reference information to the work position estimation model 122.

The position definition unit 128 defines the position from the product 3D, the equipment 3D, and the like, as will be described later. The position definition unit 128 adds position information to the unit work definition unit 126 in order to define the position where the unit work is performed. The position definition unit 128 provides learning or setting data to the learning/setting unit 129 based on the work position.

The learning/setting unit 129 based on the work position performs learning or setting from the work position estimation model 122, the general-purpose work recognition module 124, the position definition unit 128, and a work item 138 of the product-specific process information 137 described later. The learning/setting unit 129 based on the work position performs learning or setting to construct the advanced work recognition model 130.

The advanced work recognition model 130 is a model for recognizing where, what, and how a worker performs a work. The advanced work recognition model 130 recognizes a work with high accuracy by adding information such as a work position on a product, which is product-specific information, to general-purpose unit work recognition.

The work recognition model library dynamic filtering 131 excludes models other than the corresponding product based on production instructions from the MES 141 in a process library including models of a plurality of vehicle models. Furthermore, completed models are excluded based on the progress of the work from the start of work to the completion of the work. The work recognition model library dynamic filtering 131 acquires information about who is a worker from the worker identification unit.

The work recognition multimodal AI (Artificial Intelligence) 132 is an artificial intelligence for recognizing who, when, where, what, and how a worker has performed work. The work recognition multimodal AI 132 acquires information from the data preparation for work recognition 105 and the work recognition model library dynamic filtering 131.

The unit work-specific work performance data output unit 133 outputs work performance data for each unit work. The unit work-specific work performance data output unit 133 acquires information from the work recognition multimodal AI 132. The data output by the unit work-specific work performance data output unit 133 is utilized in the application (APPL) 142 for safety and ergonomics improvement, quality assurance improvement, productivity improvement, etc.

The BOM 135 is parts information necessary for manufacturing products according to the parts list, and it is essential information for understanding how parts are assembled.

The PDM, BOP, and BOE 136 include a work element master 139, product-specific process information 137, and product and process drawing information 140.

The work element master 139 is master information that standardizes and generalizes work components across products, and includes, for example, work objects, work verbs, tools, work positions, and so on. The product-specific process information 137 includes the work item 138 which is a combination of work elements defined in the work element master 139 and detailed work procedure information. The product and process drawing information 140 includes information of parts 3D, process layout, equipment 3D, and so on.

The work element master 139 provides information to the unit work definition unit 126. The product-specific process information 137 acquires information from the work element master 139, provides information to the product and process drawing information 140, and provides learning or setting data to the learning/setting unit 129 based on the work position. The product-specific process information 137 is provided through the work element master 139 that is defined standardly across products, and the general-purpose work recognition module 124 provides information to the position definition unit 128 and the area-specific reference coordinate control unit 127.

The MES 141 is a manufacturing execution system that monitors and manages factory equipment and worker's works by linking them with each part of a factory production line. The MES 141 acquires information from the BOP and BOE 136. The MES also includes a production instruction database to provide production instruction information to the work recognition model library dynamic filtering 131. Production instructions are instructions to people and equipment such as parts and procedures used in addition to the types and specifications of individual products in accordance with the production plan.

(Description of General-Purpose Work Recognition Module According to the Embodiment)

Figure 2:
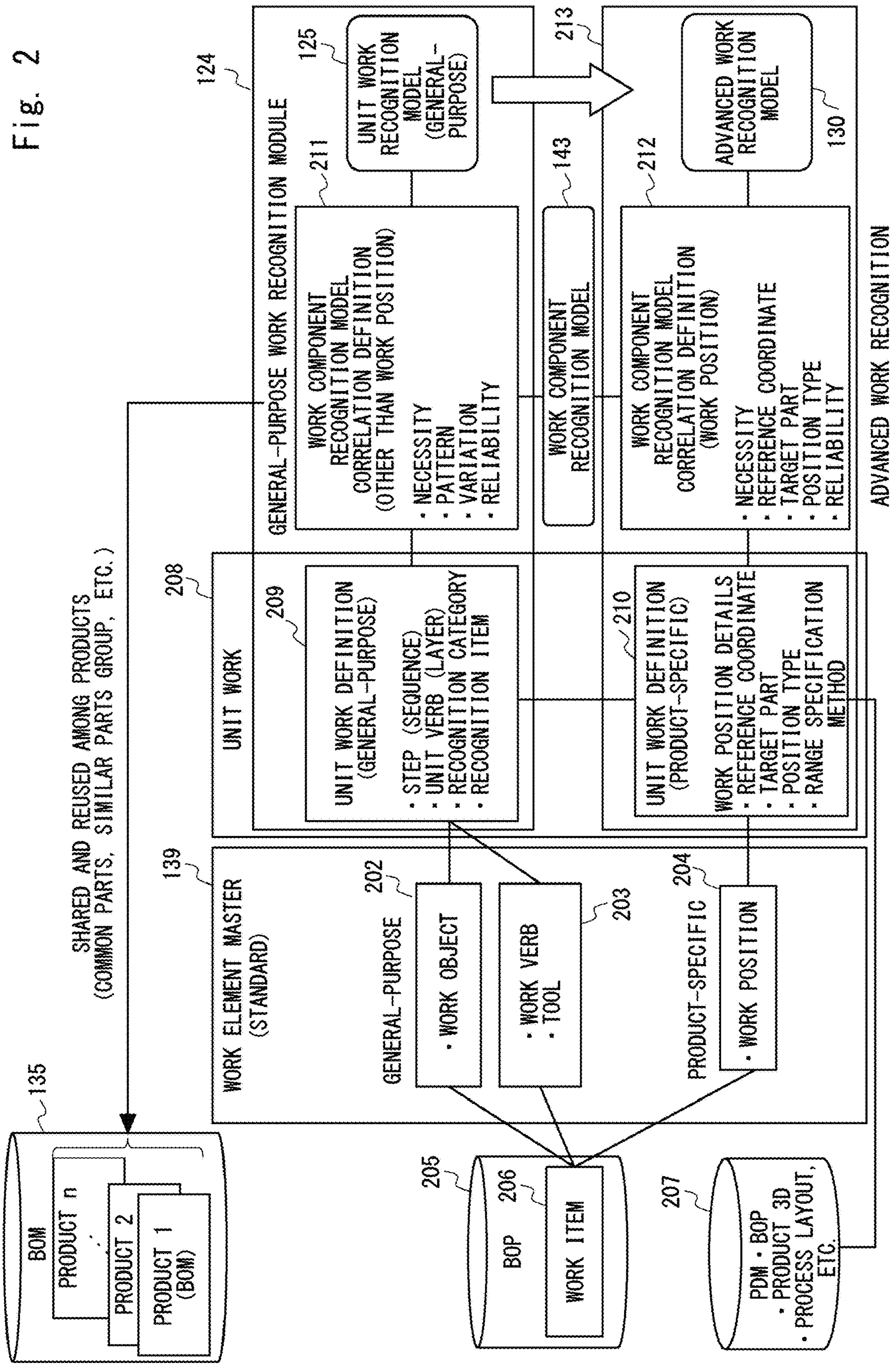
FIG. 2 is a correlation block diagram of components related to unit work recognition and advanced work recognition according to the embodiment.
Figure 3:
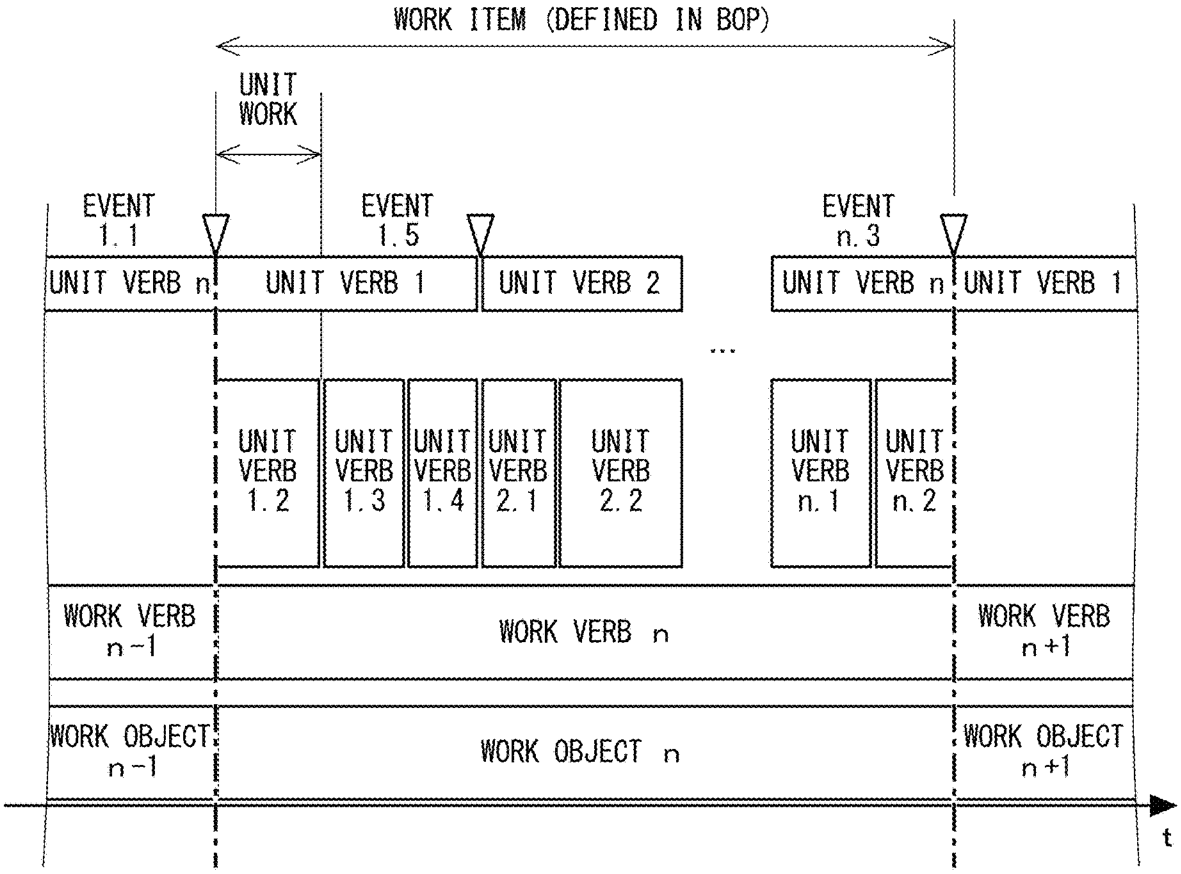
FIG. 3 shows a relationship between unit verbs and work verbs according to the embodiment.
Figure 6:
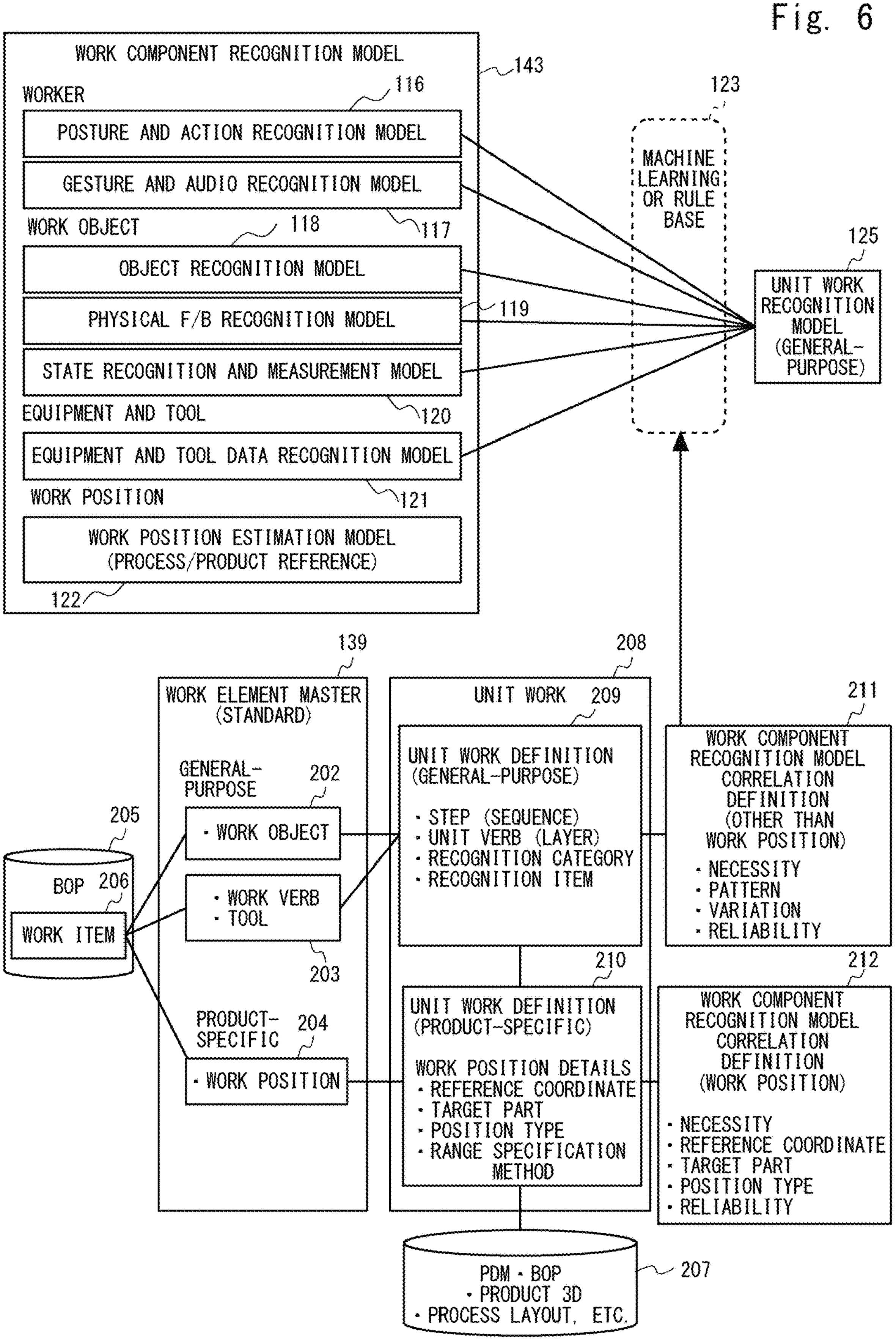
FIG. 6 is a block diagram showing a relationship between a work component recognition model and a unit work recognition model according to the embodiment.
Figure 7:
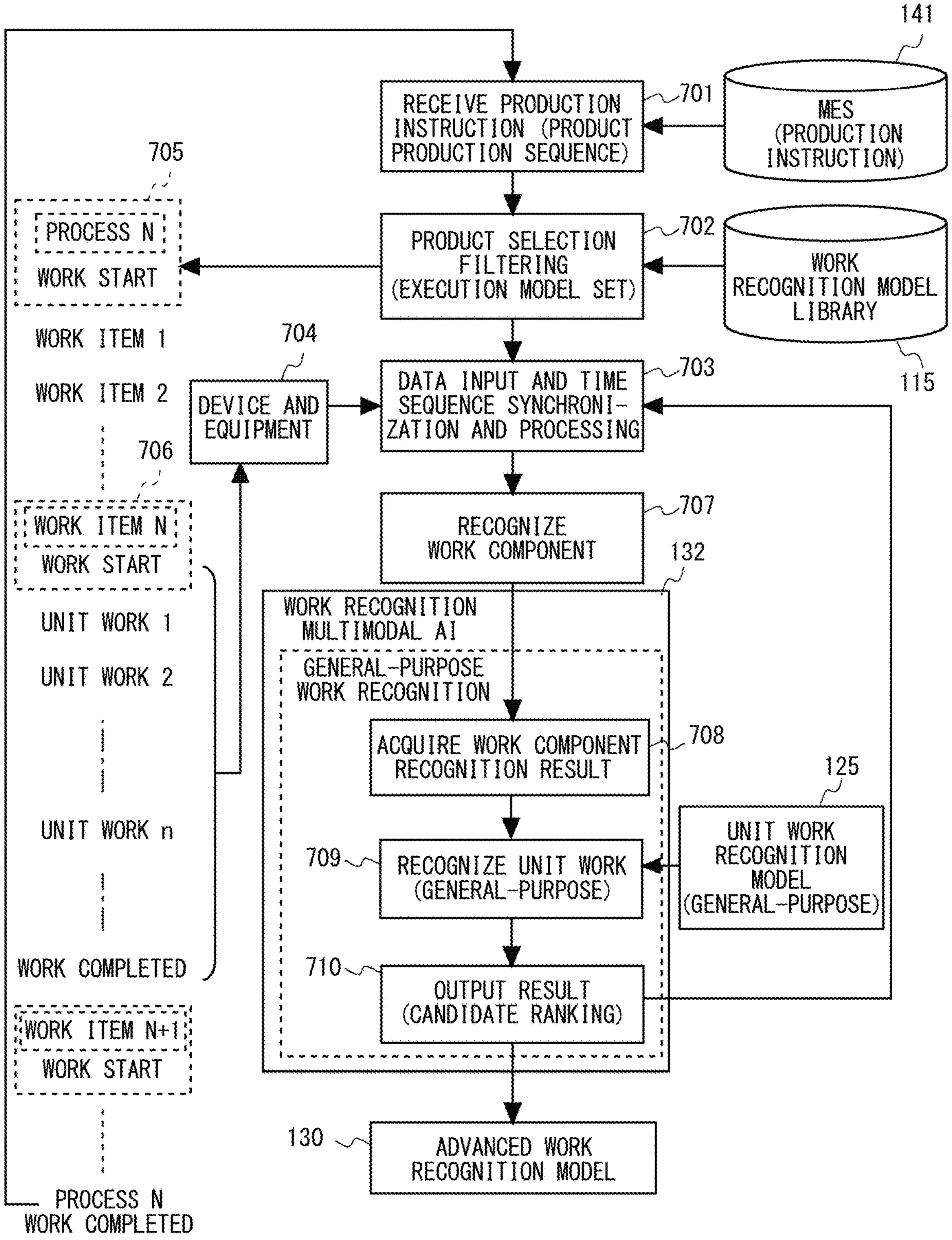
FIG. 7 is a flowchart of unit work recognition in the production of a product according to the embodiment.

FIG. 2 is a correlation block diagram of components related to unit work recognition and advanced work recognition according to the embodiment. FIG. 3 shows the relationship between work verbs and unit verbs according to the embodiment. FIG. 4 shows an example of the relationship between unit work and the recognition model according to the embodiment. FIG. 5 is a continuation of an example of the relationship between the unit work and the recognition model of FIG. 4 according to the embodiment. FIG. 6 is a block diagram showing the relationship between the work component recognition model and the unit work recognition model according to the embodiment. FIG. 7 is a flowchart of the unit work recognition in the production of a product according to the embodiment. The unit work recognition according to the embodiment will be described with reference to FIGS. 2 to 7.

As shown in FIG. 2, the general-purpose work recognition module 124 recognizes work items that are divided into work elements such as general-purpose work verbs and work objects. In addition, the general-purpose work recognition module 124 defines, learns, or sets a correlation with the work component recognition model 143, with the unit work defined by the unit verb that is finely divided to a level suitable for work recognition as a master. Therefore, the general-purpose work recognition module 124 constitutes a general-purpose work recognition module independent of individual products and processes. By being shared among different products, the general-purpose work recognition module 124 enables efficient maintenance and operation, including adaptation to changes in products and processes.

The work element master 139 includes a work object 202 and information of a work verb and a tool 203 as a general-purpose work element. The work element master 139 includes information of a work position 204 as a product-specific work element. The information of the work object 202, the work verb/tool 203, and the work position 204 is acquired from a work item 206 of the BOP 205.

The work item 206 defines a series of works for producing a product by a combination of work objects and work verbs. Work elements are elements constituting the work item 206. Main work elements are work verbs, work objects, tools, work positions, and so on. Among them, work verbs, work objects, and tools can be defined as general master items to perform data aggregation and analysis across products and factories. Since the work positions may vary depending on the product, even for the same part, classification codes for work positions can be standardized, but the work positions themselves are treated as product-specific work elements.

The general-purpose work recognition module 124 includes a unit work definition unit (general-purpose) 209, a work component recognition model correlation definition unit (other than work positions) 211, and a general-purpose unit work recognition model 125.

Furthermore, the unit work 208 is a further subdivision of the content of general-purpose work elements such as work verbs, work objects, and tools. Specifically, a unit work is a work verb that is elementally decomposed to a unit suitable for work recognition, and the work is separated by the unit. The unit work 208 includes a unit work definition unit (general-purpose) 209 and a unit work definition unit (product-specific) 210.

The unit work definition unit (general-purpose) 209 includes a step, which is a work sequence, a unit verb defined in a hierarchical structure according to the granularity, recognition category, and information of the recognition item. The unit work definition unit (general-purpose) 209 is associated with the work object 202 and the work verbs and tools 203. The unit verb is a verb of a degree of granularity that enables recognition of work. Although the work verb in the work item 206 can be defined at various granularities as desired, the work recognition according to the present disclosure is intended to recognize various operations performed on a manufacturing site in a specific and detailed manner. Therefore, it is necessary to further subdivide work verbs with coarse granularity into recognizable granularities. If the difference between the granularity of the work verb and that of the unit verb is large, it may be permissible to perform the subdivision in multiple layers.

The recognition categories include two targets, motion and event, for recognizing unit works, which are defined according to the characteristics of the tasks and the recognition purposes. Therefore, the general-purpose work recognition module 124 can recognize various works in detail. The motion is recognized as a mass which continuously performs the works in a time series manner. Therefore, a continuous action such as walking is recognized. The event recognizes a specific cross section with a work such as a tightening start and a tightening completion. Therefore, an accurate work segmentation timing is recognized.

Recognition items are used to define specific recognition objects such as start and end for recognition categories of unit verbs.

The work component recognition model correlation definition unit (other than work position) 211 assigns a work component recognition model (other than work position recognition model which is a product-specific work component) suitable for recognition according to work characteristics to work elements (work verb×work object)×unit work (unit verb, recognition category, item) and defines the correlation. The work component recognition model correlation definition unit (other than work position) 211 includes information of the degree of necessity, pattern, variation, and reliability.

The degree of necessity is defined for each work component recognition model 143 so that the assignment of the unit work 208 and the work component recognition model 143 can be efficiently performed, and the robustness can be maintained and controlled when the output from a part of the model is missing. Patterns and variations are patterns and detailed variations to be recognized by the work component recognition model 143. Reliability is defined for each work component recognition model 143 to enable recognition accuracy evaluation in the system. The reliability is set based on optional settings or actual recognition result data. This evaluation is used, for example, when a plurality of candidates emerge during work recognition with the general-purpose work recognition module 124, to rank these candidates.

The general-purpose work recognition module 124 is shared and reused across products when there are common parts or similar parts among products.

As shown in FIG. 3, a work object n and a work verb n are acquired from the work item 206 of the BOP 205. The work verb n is divided into a unit verb 1, a unit verb 2, . . . and a unit verb n. The unit verb 1 is further divided into a unit verb 1.2, a unit verb 1.3, and a unit verb 1.4. FIG. 3 shows the relationship between the work verbs and the unit verbs as an example. The third or subsequent layer may be provided to further subdivide the unit verb.

Specifically, as in the example shown in FIG. 4, the extraction of the unit verb 1 is decomposed into a unit verb 1.1 of conveying with empty hands, a unit verb 1.2 of grasping, and a unit verb 1.3 of conveying.

As shown in FIG. 6, the work component recognition model correlation definition unit (other than the work position) 211 is reflected in the unit work recognition model 125 through the learning/setting unit 123 based on the work component recognition model learned or set in the work component recognition model 143. FIG. 5 is a continuation of the vertical columns of FIG. 4. For example, as shown in FIG. 5, the grasping of the unit verb 1.2 is associated with the object recognition model 118 and the physical F/B recognition model 119. The grasping of the unit verb 1.2 is also associated with the posture and action recognition model 116. Furthermore, the grasping of the unit verb 1.2 is associated with the equipment and tool data recognition model 121. In this way, the work component recognition model correlation definition unit (other than the work position) 211 associates the unit verb with the work component recognition model 143.

The method of unit work recognition in the production of a product is shown in FIG. 7. The information processing apparatus first receives, from the MES 141, a production instruction 701. The information processing apparatus acquires the product production sequence by receiving the production instruction. Next, the information processing apparatus acquires, from the work recognition model library 115, product selection filtering 702. The product selection filtering will be described later. The information processing apparatus acquires the work recognition model necessary for the product from the library by the product selection filtering, constitutes a set of models necessary for the execution of the work recognition of the product, and a process N starts the work 705. Then, the work item N of the process N starts 706. Next, the information processing apparatus performs data input and time series synchronization and processing from device and equipment 704 at any time during the process of executing the work 703, and then performs work component recognition 707. In the general-purpose work recognition unit of the work recognition multimodal AI 132, work component recognition results are continuously acquired 708 and passed to a unit work recognition (general-purpose) 709. The unit work recognition (general-purpose) recognizes the general-purpose unit work 709 by matching it with the unit work recognition model 125, and outputs the recognition result 710. When a plurality of unit works are recognized in the unit work recognition, a plurality of candidates ranked in the order of reliability as described above are output.

The result output is passed to the advanced work recognition model 130. Further, the processing of 703 to 710 is carried out continuously until the completion of the work of the process N.

Thus, a general-purpose work recognition module which can recognize a unit work independent of products is provided.

(Explanation of Area-Specific Reference Coordinate Control Unit According to Embodiment)

Figure 9:
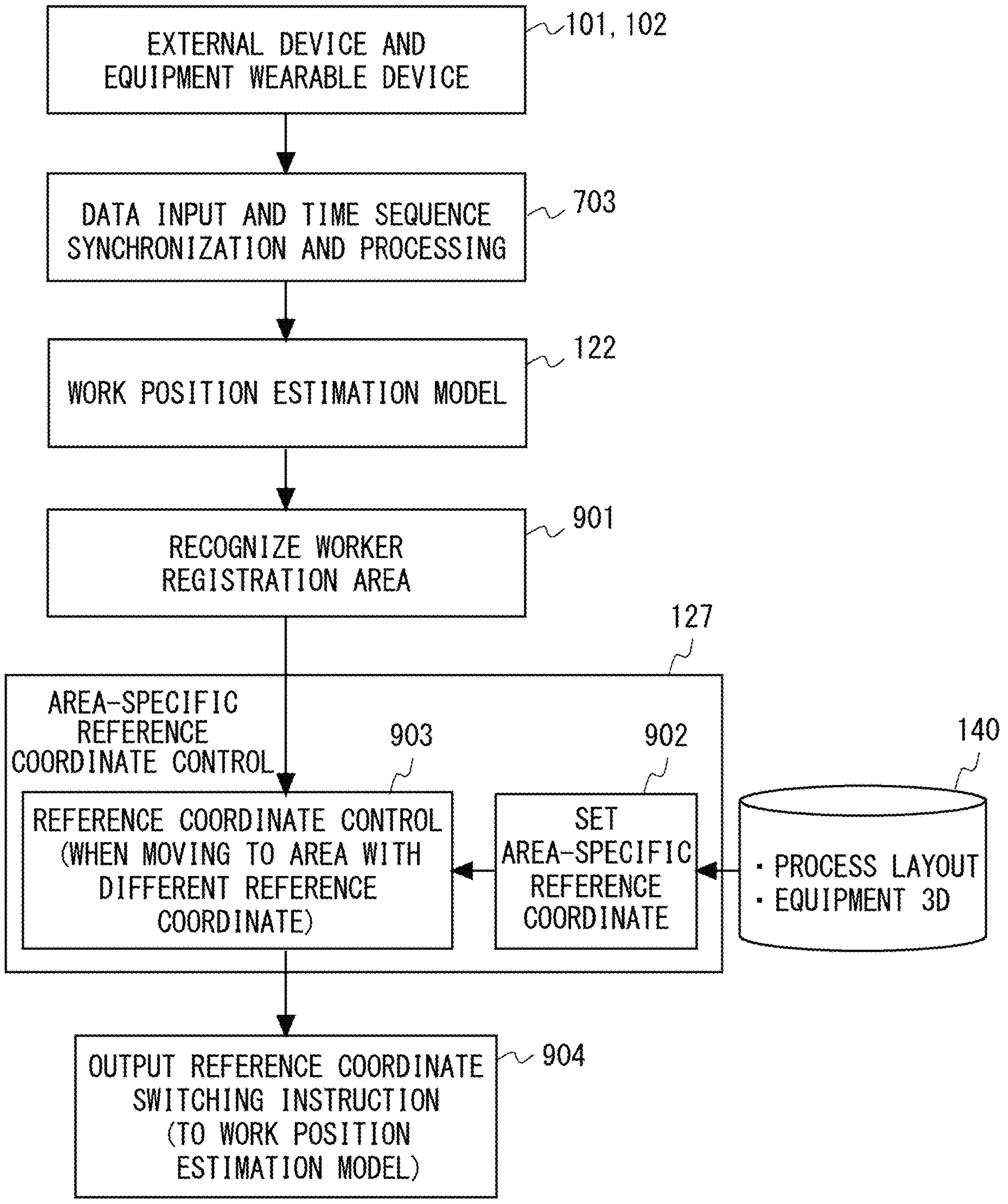
FIG. 9 is a reference coordinate setting flowchart for the production of a product according to the embodiment.

FIG. 8 is a diagram for explaining a reference coordinate setting unit for setting coordinates of a fixed reference and a conveying item (object) reference according to the embodiment. FIG. 9 is a flowchart for setting reference coordinates in the production of a product according to the embodiment. Referring to FIGS. 8 and 9, the area-specific reference coordinate control unit 127 according to the embodiment will be described.

As shown in FIG. 8, in a line-style production site, work objects flow along the line within the factory during production. For example, there are cases where the position of the work object does not move with respect to the floor surface during a work such as part processing and assembly work on a fixed workbench, and cases where the work object is conveyed to a conveyance system such as a work to assemble parts to the body of a vehicle conveyed by a conveyor. For each case, two reference coordinates of the work position estimation model are provided: a fixed reference and a conveying item (object) reference. By dynamically switching these two reference coordinates according to the work area of the worker, the work position coordinates necessary for work recognition are accurately acquired.

As shown in the upper drawing of FIG. 8, when objects 800, 801, 802, and 803 flow on the conveying system, the area-specific reference coordinate control unit 127 of FIG. 9 defines an area where a work is performed on the conveying items 800 and so on as a conveying item reference application area, and other areas as fixed reference application areas. With regard to the switching of reference coordinates, the aforementioned areas are separated in advance on the line layout, and reference coordinates to be applied to each area are defined. This enables application of reference coordinates sequentially defined according to the position of the worker.

As shown in the middle drawing of FIG. 8, the fixed reference refers to coordinates fixed relative to the floor of the line, such as building pillars and workbenches. The fixed reference is set to an area where the work object does not move with respect to the floor surface during the work of a worker. On the other hand, as shown in the lower drawing of FIG. 8, the conveying item reference is based on the coordinates of the conveying item when the object items 800 or the like flows on the conveying system. When the work object moves with respect to the floor surface, it is set as the conveying item reference.

In the case where the conveying item reference is applied, the position information of the work object on the conveying system is acquired in real time by connecting with the conveying system, and the work position is estimated by the conveying item reference (more precisely, the conveyed work object reference).

As shown in FIG. 9, the setting of the fixed reference and the object reference is executed by the area-specific reference coordinate control unit 127, which is the reference setting unit. First, the information processing apparatus performs, from the external devices and equipment 101 and the wearable device 102, data input and time series synchronization and processing 703. The information processing apparatus inputs data into the work position estimation model 122. Then, the information processing apparatus recognizes a worker registration area 901. The area-specific reference coordinate control unit 127 executes reference coordinate control 903 when the worker registration area acquired from the worker registration area recognition 901 moves to a different area based on area-specific reference coordinate setting 902 previously set by referring to the process layout and equipment 3D. Next, to the work position estimation model 122, the reference coordinate switching instruction is output 904. In this way, the reference coordinates for each area are controlled according to the area where the worker is registered.

(Explanation of Advanced Work Recognition According to the Embodiment)

Figure 12:
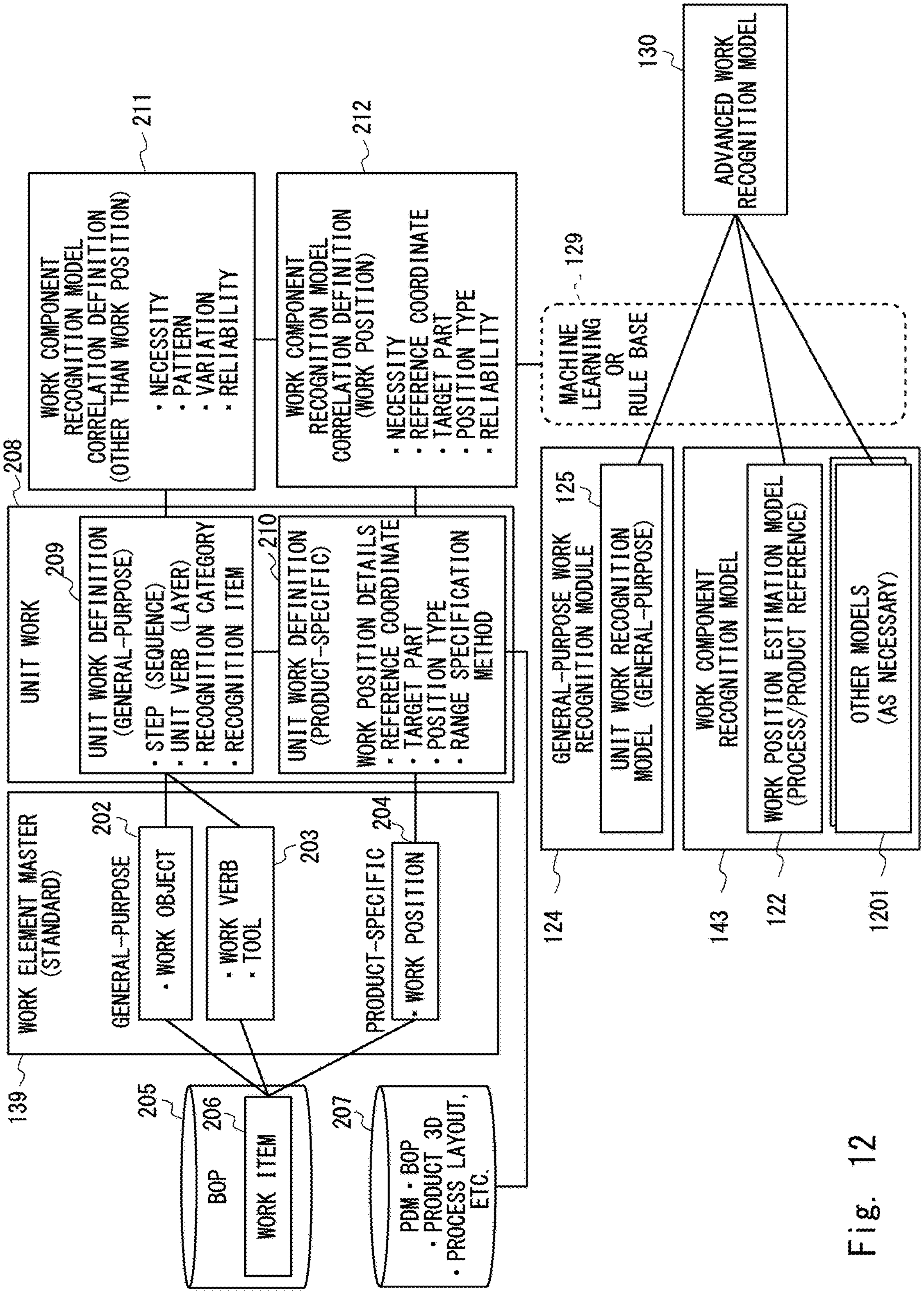
FIG. 12 is a block diagram showing a relationship between a unit work recognition model, a work component recognition model for advanced work recognition, and an advanced work recognition model according to the embodiment.
Figure 13:
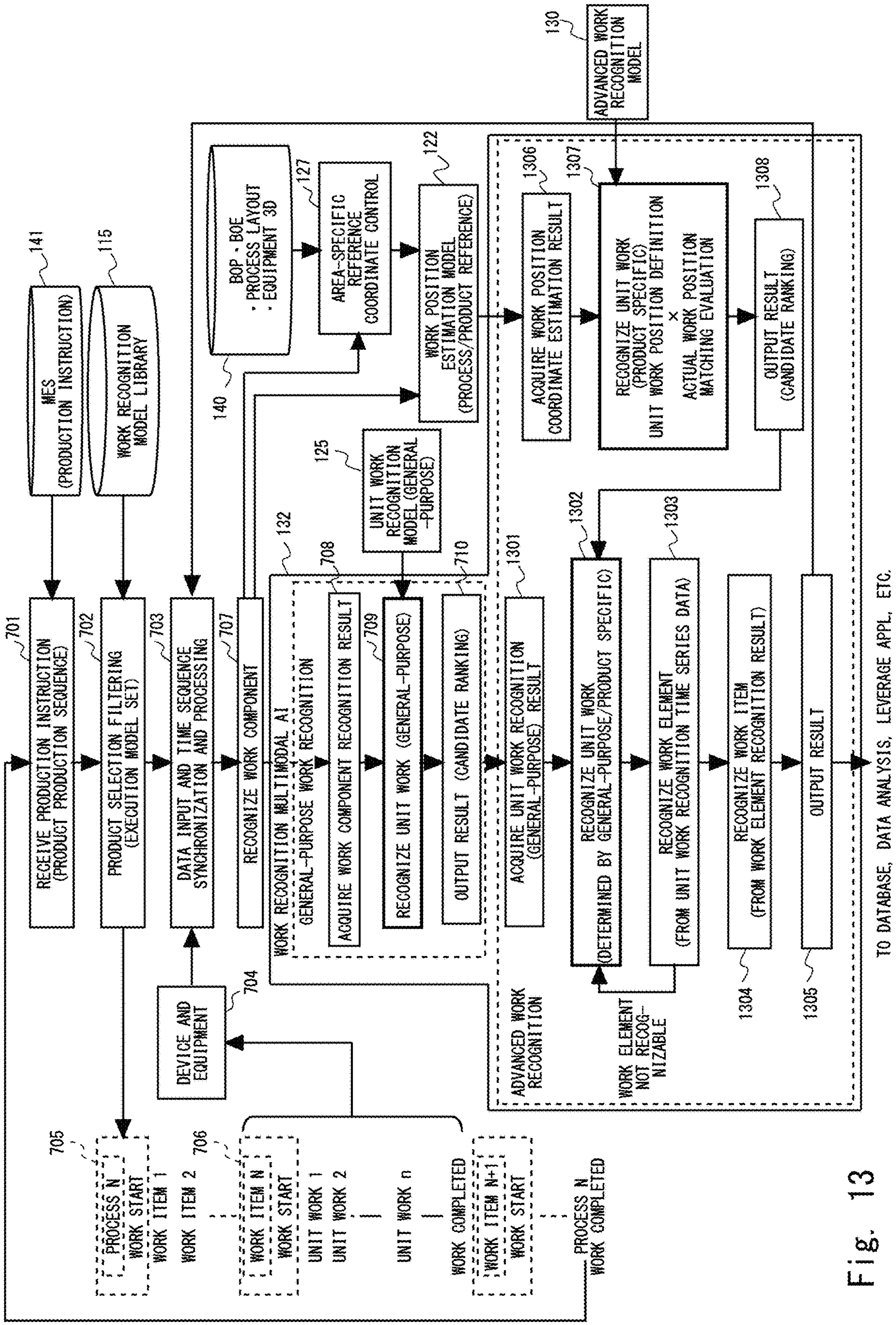
FIG. 13 is a flowchart of advanced work recognition in the production of a product according to the embodiment.

The advanced work recognition according to the embodiment will be described with reference to FIGS. 2 and 10 to 13. FIG. 10 shows an example of adding a work position to the unit work according to the embodiment. FIG. 11 is a continuation of an example of adding a work position to the unit work of FIG. 11 according to the embodiment. FIG. 12 is a block diagram showing the relationship between the unit work recognition model, the work component recognition model for the advanced work recognition, and the advanced work recognition model according to the embodiment. FIG. 13 is a flowchart of the advanced work recognition in the production of a product according to the embodiment.

As shown in FIG. 2, the advanced work recognition 213 performs high-definition and high-precision work recognition by combining work position information specific to the product and process with the output obtained by the general-purpose work recognition module 124. In some cases, the advanced work recognition 213 may additionally include individual recognition models. In addition, the advanced work recognition 213 is operated in conjunction with the general-purpose work recognition module 124 to enable efficient configuration of the advanced work recognition model corresponding a difference between products and a difference between steps while maximizing versatility.

As shown in FIG. 2, the advanced work recognition 213 includes the unit work definition unit (product-specific) 210, a work component recognition model correlation definition unit (work position) 212, and the advanced work recognition model 130.

The unit work definition unit (product-specific) 210 includes a reference coordinate which is work position detail, a target part, a position type, and a range specification method. The unit work definition unit (product-specific) 210 is included in the unit work 208, and acquires a work position code which is set as a standard for all products from the product-specific work position 204 of the work element master 139. The unit work definition unit (product-specific) 210 acquires 3D coordinate information and process layout information of a product as a detailed work position from a PDM and BOP 207.

The reference coordinate is selected from either the fixed reference defined in FIG. 8 or the conveying item reference.

The target part indicates a body part of the worker whose work position is to be obtained. The target part includes, for example, the head, arms, and legs.

A position type is a method for specifying a position. The position type is, for example, a two-dimensional plane and a three-dimensional space.

The range specification method is a method of specifying a range of a work position. The range specification method involves, for example, specifying the position range using two diagonal points of a three-dimensional object or a planar shape, or specifying the position range along a path.

The work component recognition model correlation definition unit (work position) 212 assigns a work component recognition model (work position recognition model which is a work component specific to a product) suitable for recognition to the work position and defines the correlation. The work component recognition model correlation definition unit (work position) 212 includes information of necessity, reference coordinates, target part, position type, and reliability.

Necessity is defined for each work component recognition model 143 so that assignment of the work position and the work component recognition model 143 can be efficiently performed, and robustness can be maintained and controlled when an output from a part of the model is missing.

The reference coordinates, the target part, and the position type use the information acquired in the unit work definition unit (product-specific) 210.

The reliability is defined for each work component recognition model 143 so that recognition accuracy evaluation can be performed in the system. The reliability is set based on arbitrary settings or actual recognition result data. This evaluation is used, for example, when a plurality of candidates appear during work recognition in the advanced work recognition 213, to rank a plurality of candidates.

The advanced work recognition model 130 combines the general-purpose work recognition module 124 and the work position estimation model 122 for work component recognition (other models are added as necessary) to enable detailed and highly accurate work recognition according to products.

As shown in FIG. 12, the unit work recognition model 125 of the general-purpose work recognition module 124, the work position estimation model 122 of the work component recognition model 143, and other models 1201 are associated with each other in the work component recognition model correlation definition unit (work position) 212, and the learning/setting unit 129 performs learning/setting based on the work position.

The advanced work recognition is performed as shown in FIG. 13. FIG. 13 shows advanced work recognition in addition to the contents described in FIG. 7. Therefore, the contents described in FIG. 7 are omitted.

When the information processing apparatus outputs the unit work recognition (general-purpose) result 710, the advanced work recognition unit of the work recognition multimodal AI 132 acquires a unit work recognition result (general-purpose) 1301. In parallel, the area-specific reference coordinate control unit 127 acquires the position information of the worker from the work component recognition 707, and transmits the information of the reference coordinate to the work position estimation model 122. The work position estimation model 122 acquires the position information of the worker from the work component recognition 707, estimates the work position coordinate by acquiring the information of the reference coordinate from the area-specific reference coordinate control unit 127, and outputs a result of the estimation to the advanced work recognition unit of the work recognition multimodal AI 132. The advanced work recognition unit acquires the work position coordinate estimation result 1306, performs matching evaluation of the unit work and the actual work position using the advanced work recognition model 130, narrows down the unit work candidates of the corresponding candidate 1307, and outputs a candidate ranking 1308.

Next, the advanced work recognition unit of the work recognition multimodal AI 132 recognizes (estimates) the unit work with the highest accuracy 1302 from the unit work recognition candidate and candidate ranking acquired from the result output 710 of the unit work recognition (general-purpose) and the result output of the unit work recognition (product-specific) 1308. In parallel, the advanced work recognition unit performs work element recognition by monitoring individual unit work recognition data in time series with respect to work elements which are a set of a plurality of unit works 1303 (work object=part X, work verb=tightening, tool=tool Y, work position code=Z, work status: in progress, completed, etc.). Next, the advanced work recognition unit performs work item recognition in conjunction with the output of the work element recognition result with respect to the work item which is a combination of work elements (example: work item=part X tightening, work status: in progress, completed, etc.) 1304. The advanced work recognition unit then outputs the aforementioned recognition results (unit work recognition 1302, work element recognition 1303, work item recognition 1304) at any time 1305. The recognition results are sent to a database, data analysis, application, or the like. Further, the processing of the advanced work recognition unit is continuously performed until the completion of the work in the process N.

When the work element recognition 1303 cannot be recognized, it returns to the unit work recognition 1302. The work element recognition 1303 is done with a plurality of results of the unit work recognition 1302.

Thus, advanced work recognition involves the advanced work recognition unit that takes as input the unit work recognition candidate (general-purpose), which is the output result of the general-purpose work recognition part of the work recognition muiltimodal AI 132, and the unit work recognition (product-specific) candidate related to the product-specific work position, which takes as input the estimation result of the work position estimation model, and highly recognizes the work. In this way, the work recognition system and the work recognition method are provided.

(Explanation of Work Recognition Model Filtering According to Embodiment)

Figure 14:
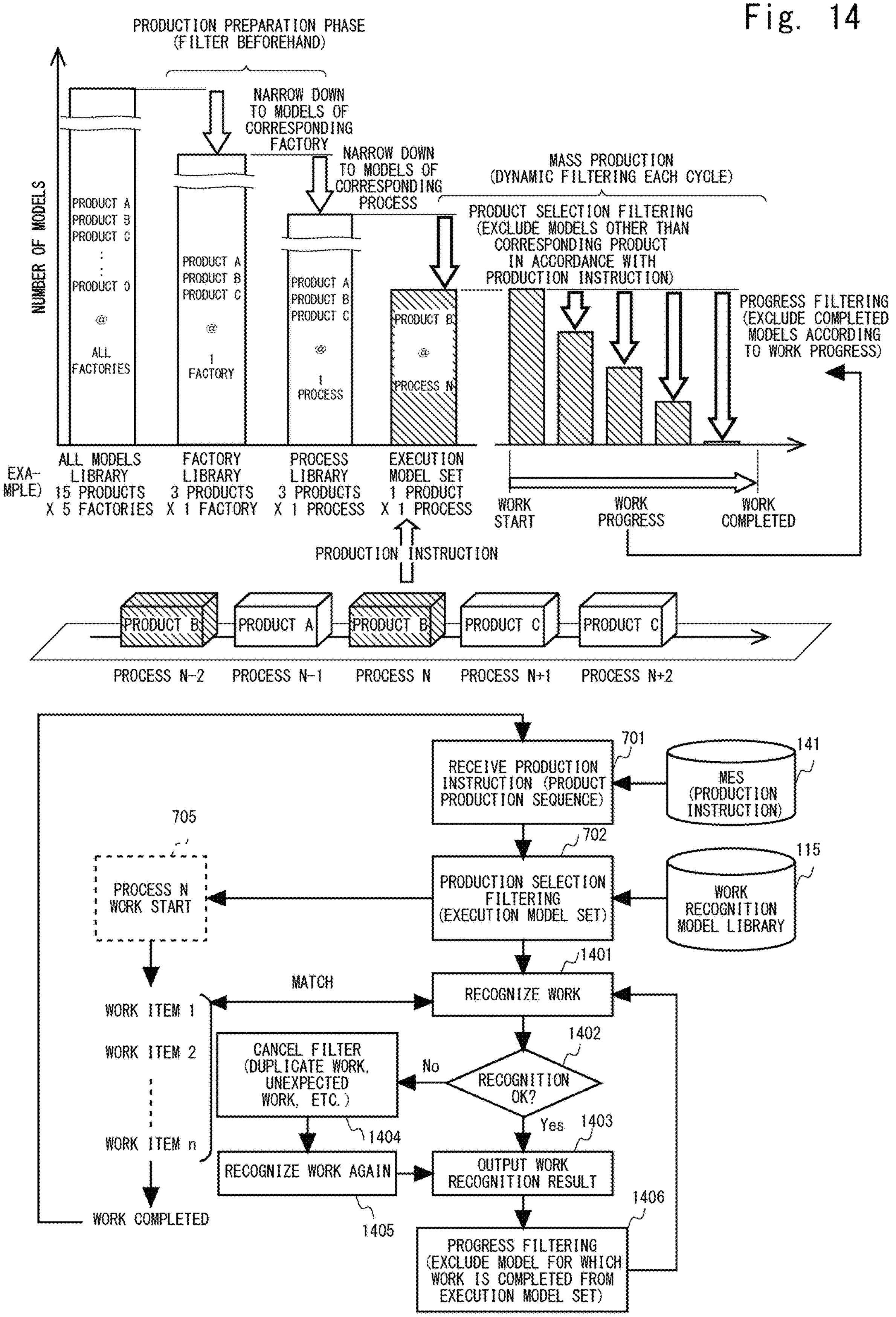
FIG. 14 is an overview diagram (upper drawing) and a flowchart (lower drawing) showing product selection filtering and progress filtering in the production of a product according to the embodiment.

FIG. 14 is an overview diagram (upper drawing) and a flowchart (lower drawing) showing product selection filtering and progress filtering in the production of a product according to the embodiment. The work recognition model filtering according to the embodiment will be described with reference to FIG. 14.

As shown in the upper drawing of FIG. 14, for a company that mass-produces various products, the model library of all products is a huge number, for example, 15 products×5 factories. Therefore, when these huge number of work recognition models are operated in a mixed flow production line, there may be problems in terms of processing speed and ability of information processing equipment. Thus, when the process transitions from the production preparation stage to the mass production stage, the corresponding models are narrowed down for each factory, and the factory library becomes, for example, 3 products×1 factory in FIG. 14. By further narrowing down the corresponding models for each process, the process library becomes, for example, 3 products×1 process in FIG. 14. If the three products are a product A, a product B, and a product C, in the case of mass production of products, for example, when a production instruction for the product B is received, the model corresponding to the product B can be narrowed down to 1 product×1 process. In this way, in a process library including a plurality of models, product selection filtering means excluding models other than the corresponding product in accordance with the production instruction.

Furthermore, progress filtering means excluding completed models in accordance with the progress of work from the start of work to the completion of work.

As shown in the lower drawing in FIG. 14, the information processing apparatus receives a production instruction from the MES 141 to obtain a product production sequence 701. Next, the information processing apparatus performs product selection filtering 702 to select the execution model set of the process N from the work recognition model library 115. The work of the process N is started 705. Next, the work items 1 and 2 . . . N are recognized 1401. In parallel, the information processing apparatus recognizes the work 1402. When the work is recognized (Yes in step 1402), the information processing apparatus outputs the work recognition result. When the work is not recognized (No in step 1402), the information processing apparatus cancels or removes the product selection filtering 1404 and performs work recognition again 1405. The reason why the product selection filtering is cancelled is because it is considered that the work which does not normally appear, such as a duplicate work or an unexpected work, has been performed. The cancellation range is arbitrarily set in advance (example: the process×the product, the process×all products, the factory×the product×the product, etc.). When work recognition is performed, the information processing apparatus outputs the work recognition result 1403. Next, the information processing apparatus excludes and selects a model for which a work is completed from the execution model set by the progress filtering 1406. Thus, the execution model is updated. The processing of 1402 to 1406 is continuously performed until the completion of the work of the process N.

As described above, the work recognition system includes a product selection filtering unit for selecting a work recognition model based on a production instruction, a progress filtering unit for selecting a work recognition model in accordance with the progress of a work, and a work recognition unit for recognizing a work from the selected work recognition model. Further, the work recognition system narrows the work recognition model to a work of one product by the product selection filtering unit. Further, the work recognition system excludes the work recognition model for the completed work by the progress filtering unit. Further, the work recognition system determines whether or not the work can be recognized, and when the work cannot be recognized, the product selection filtering is removed, the work is recognized again, and then the work recognition result is output.

In this way, a learning model is selected in accordance with the progress of the work, and the processing time required for the determination by the unnecessary learning model is shortened, thereby providing a work recognition system capable of performing advanced work recognition at high speed.

(Explanation of Diversity Input Control Unit According to the Embodiment)

Figure 16:
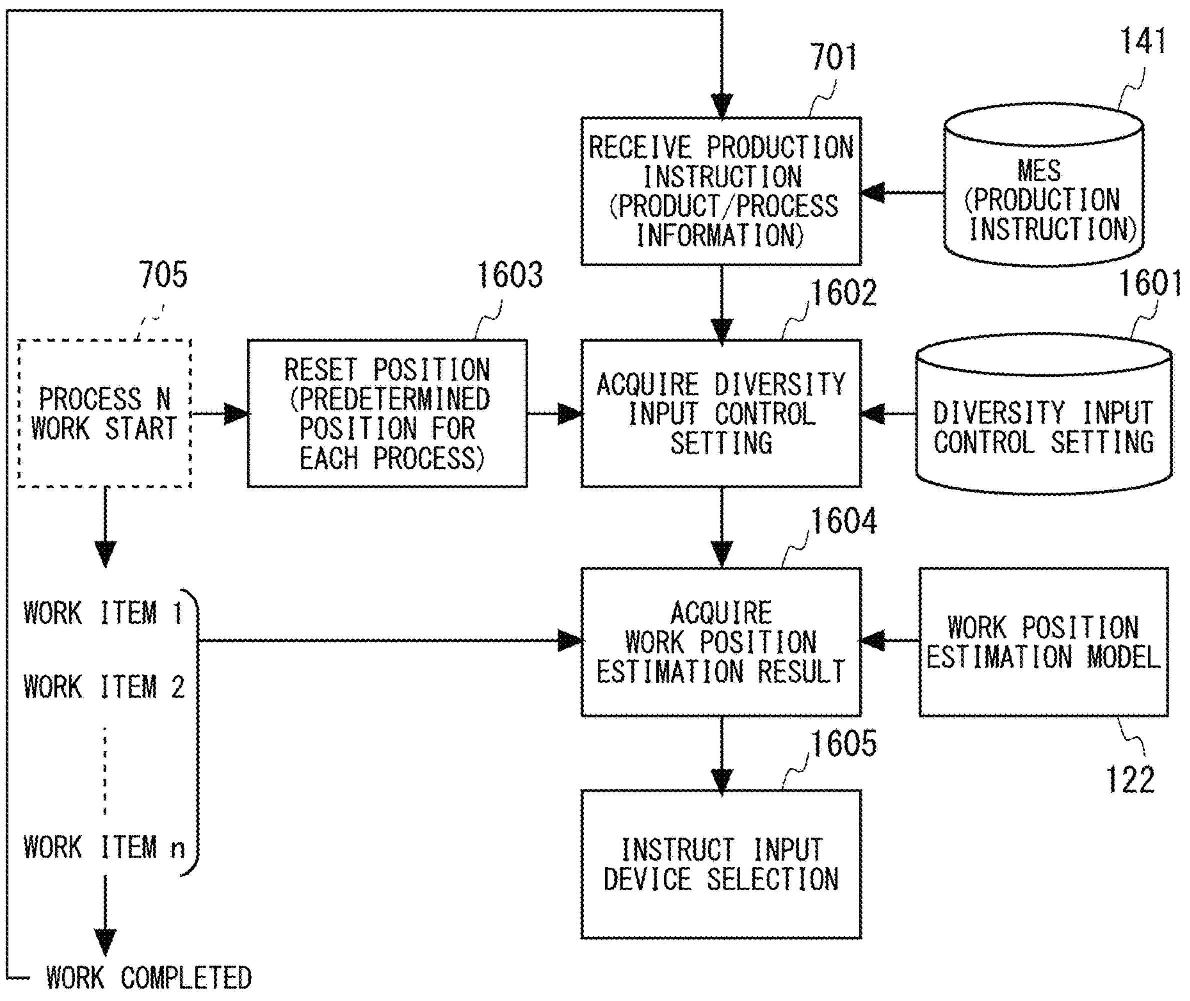
FIG. 16 is a flowchart showing a process of prioritizing and switching a plurality of sensors or devices based on the work position in diversity input control according to the embodiment.

FIG. 15 shows an example of cooperation of data acquisition of sensors corresponding to the work area according to the embodiment (upper drawing), an overview diagram of the work area (lower left drawing), and a table of correspondence between the work areas and sensors (lower right drawing). FIG. 16 is a flowchart showing a process of prioritizing and switching a plurality of sensors or devices according to the work position in the diversity input control according to the embodiment. The diversity input control unit according to the embodiment will be described with reference to FIGS. 15 and 16.

When acquiring work performance data using a plurality of sensors or devices such as a camera, GPS, IMU, or the like, the sensors or devices may not be usable due to obstacles (such as blind spots of the camera), or may not function properly (due to reflection and shielding of GPS radio waves), depending on the process and the positional relationship between such device and the product. Therefore, in a system provided with a plurality of sensors or devices, the diversity input control unit 113 ensures robustness and accuracy of data acquisition by automatically selecting the most appropriate device according to the work position.

As shown in the lower left drawing of FIG. 15, the peripheral area of the object is divided into an object separation area, which is an area (zone A) that separates the work area from the object and is not affected by obstacles such as equipment, an object contact area, which is an area (zone B) where contact is made with the object, and an object interior area, which is an area (zone C) within the object.

Using the acquisition of the work position as an example, as shown in the right lower drawing of FIG. 15, the work position can be accurately detected by an indoor GPS in the zone A. The position can also be estimated by the IMU-based position estimation. However, because the accuracy of the indoor GPS is higher, the indoor GPS is prioritized in the zone A, and the IMU is used as a backup. When an image of an object is captured, the zone A cannot be used, because it falls outside the imaging range.

Similarly, in the zone B, "position estimation based on image" or "position estimation based on image skeleton estimation or image object recognition or the like" can be obtained from an image in which the object is captured, making position estimation based on image skeleton estimation the most advantageous in terms of accuracy (although in some cases, other devices may be more accurate depending on the angle of inclination and distance from the camera). In the zone B, IMU is used as a second backup and the indoor GPS is used as a third backup, because the accuracy of indoor GPS is poor in areas where there are many radio wave shielding and reflection objects.

In the zone C, position estimation using IMU is given the highest priority. Within the object, when the object shields the radio waves, the indoor GPS cannot be used, or the accuracy is extremely deteriorated. In addition, the "position estimation based on the image" or "position estimation based on image skeleton estimation or image object recognition or the like" for capturing an image of the object can be used in some cases in the area which does not become a blind spot, and thus used as a backup.

When the worker performs the work on a work path as shown in the upper drawing of FIG. 15, the position estimation based on the image skeleton estimation is performed by the indoor GPS at the work position 1 and the position estimation inheriting the position data is performed at the work positions 2 and 3. Similarly, the position estimation inheriting the position data based on the IMU is performed at the work positions 4 and 5 and the position estimation inheriting the position data based on the image skeleton estimation is performed at the work position 6.

As shown in FIG. 16, the information processing apparatus first receives from the MES 141 the production instruction 701. Next, the information processing apparatus acquires from the diversity input control setting unit 1601 the diversity input control setting 1602. In parallel, a work of the process N is started 705. At the start, if the work start position is fixed as a predetermined position for each step, the position is reset 1603. The information processing apparatus acquires the position reset information. Next, the information processing apparatus continuously acquires, using the work position estimation model 122, the work position estimation results of the work item 1, work item 2 . . . and work item n 1604. During the work in the process N, the information processing apparatus instructs the selection of an input device in accordance with the work position estimation results at any time 1605.

As described above, the diversity input control unit includes the work position information acquisition unit for acquiring the position of the worker, and the control unit for switching and prioritizing a plurality of sensors or devices to be input in accordance with a previously divided work area. The divided areas are an object separation area separated from the object, an object contact area in contact with the object, and an object interior area. In addition, position information is acquired in the object separation area by preferentially using, for example, the indoor GPS, position information is acquired in the object contact area by preferentially using, for example, image skeleton estimation, and position information is acquired in the object interior area by preferentially using, for example, IMU. Further, the diversity input control unit includes the reception unit for receiving production instructions, and the input control setting acquisition unit for acquiring input control settings of a plurality of sensors or devices in accordance with the production instructions.

In this way, a position information acquisition system and a position information acquisition method can be provided, in which a plurality of sensors or devices are provided, and the robustness and accuracy of data acquisition can be ensured by automatically selecting the optimum sensor or device according to the work position.

Some or all of the processing in the information processing apparatus described above can be implemented as a computer program. Such program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

It should be noted that the present disclosure is not limited to the above embodiments and can be suitably modified to the extent that it does not deviate from the purpose.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A position information acquisition system comprising:
- a position estimation unit configured to estimate position information of a work object from a plurality of sensors or devices;
- a position information acquisition unit configured to acquire position information of a worker from the plurality of sensors or devices; and
- a control unit configured to:
  - obtain a divided area by dividing a peripheral area of the work object into at least an object exterior area and an object interior area based on the position information of the work object estimated by the position estimation unit, and
  - switch or prioritize the plurality of sensors or devices configured to acquire the position information of the worker, in accordance with a position of the worker on the position being derived from the position information of the worker acquired by the position information acquisition unit.

2. The position information acquisition system according to claim 1, wherein
- in the object exterior area, the position information of the worker is acquired by position estimation based on an image skeleton estimation, an indoor GPS (Global Positioning System) or an IMU (Inertial Measurement Unit), and
- in the object interior area, the position information of the worker is acquired by the IMU or the position estimation based on the image skeleton estimation.

3. The position information acquisition system according to claim 1, further comprising:
- a reception unit configured to receive a production instruction; and
- an input control setting acquisition unit configured to acquire input control settings of the plurality of the sensors or devices in accordance with the production instruction.

4. A position information acquisition method comprising:
- estimating position information of a work object from a plurality of sensors or devices;
- acquiring position information of a worker from the plurality of sensors or devices;
- obtaining a divided area by dividing a peripheral area of the work object into at least an object exterior area and an object interior area based on the estimated position information of the work object; and
- switching or prioritizing the plurality of sensors or devices configured to acquire the position information of the worker, in accordance with a position of the worker on the divided area, the position being derived from the acquired position information of the worker.

5. A non-transitory computer readable medium storing a program for causing an information processing apparatus to execute:
- estimating position information of a work object from a plurality of sensors or devices;
- acquiring position information of a worker from the plurality of sensors or devices;
- obtaining a divided area by dividing a peripheral area of the work object into at least an object exterior area and an object interior area based on the estimated position information of the work object; and
- switching or prioritizing the plurality of sensors or devices configured to acquire the position information of the worker, in accordance with a position of the worker on the divided area, the position being derived from the acquired position information of the worker.

* * * * *